(12) United States Patent
Jeong

(10) Patent No.: US 11,337,174 B2
(45) Date of Patent: May 17, 2022

(54) METHOD AND APPARATUS FOR PROVIDING SERVICES IN HETEROGENEOUS NETWORK SYSTEM

(71) Applicant: SK TELECOM CO., LTD., Seoul (KR)

(72) Inventor: Sangsoo Jeong, Seoul (KR)

(73) Assignee: SK Telecom Co., Ltd., Seoul (KR)

(*) Notice: Subject to any disclaimer, the term of this patent is extended or adjusted under 35 U.S.C. 154(b) by 22 days.

(21) Appl. No.: 16/517,757

(22) Filed: Jul. 22, 2019

(65) Prior Publication Data

US 2019/0342850 A1 Nov. 7, 2019

Related U.S. Application Data

(63) Continuation of application No. PCT/KR2018/000413, filed on Jan. 9, 2018.

(30) Foreign Application Priority Data

Oct. 27, 2017 (KR) .................. 10-2017-0141485

(51) Int. Cl.
*H04W 60/00* (2009.01)
*H04B 7/26* (2006.01)
(Continued)

(52) U.S. Cl.
CPC .......... *H04W 60/00* (2013.01); *H04B 7/2606* (2013.01); *H04W 16/14* (2013.01);
(Continued)

(58) Field of Classification Search
CPC . H04W 60/00; H04W 48/18; H04W 28/0247; H04W 16/14; H04W 16/32;
(Continued)

(56) References Cited

U.S. PATENT DOCUMENTS 10,084,700 B1* 9/2018 Malhotra ............ H04L 65/1006
10,524,178 B2 12/2019 Wang
(Continued)

FOREIGN PATENT DOCUMENTS

CN 1960362 A 5/2007
CN 101064956 A 10/2007
(Continued)

OTHER PUBLICATIONS

International Search Report dated Jul. 24, 2018 issued in Application No. PCT/KR2018/000413.
(Continued)

*Primary Examiner* — Congvan Tran
(74) *Attorney, Agent, or Firm* — Ked & Associates LLP

(57) ABSTRACT

A method of providing a service in heterogeneous network systems and an apparatus therefor are disclosed. The method and apparatus of some embodiments of the present disclosure resolve the difficulty or inability to directly provide a particular service in heterogeneous network systems by a network system to which a user equipment is connected, by providing a service that temporarily provide the particular service by utilizing resources or functions of another network system.

8 Claims, 6 Drawing Sheets

(51) Int. Cl.
  *H04W 16/14* (2009.01)
  *H04W 16/32* (2009.01)
  *H04W 28/02* (2009.01)
  *H04W 48/18* (2009.01)

(52) U.S. Cl.
  CPC ....... *H04W 16/32* (2013.01); *H04W 28/0247* (2013.01); *H04W 48/18* (2013.01)

(58) Field of Classification Search
  CPC ....... H04W 88/06; H04W 36/14; H04W 8/22; H04W 60/005; H04B 7/2606
  USPC ...................................................... 455/435.1
  See application file for complete search history.

(56) References Cited

U.S. PATENT DOCUMENTS

| | | | |
|---|---|---|---|
| 2011/0171924 | A1 | 7/2011 | Faccin et al. |
| 2011/0194530 | A1 | 8/2011 | Tinnakornsrisuphap et al. |
| 2011/0312267 | A1 | 12/2011 | Oh et al. |
| 2012/0300622 | A1 | 11/2012 | Kruglick |
| 2013/0318257 | A1 | 11/2013 | Lee et al. |
| 2014/0274066 | A1 | 9/2014 | Fodor et al. |
| 2014/0370842 | A1 | 12/2014 | Abtin et al. |
| 2015/0146685 | A1 | 5/2015 | Han et al. |
| 2017/0034748 | A1* | 2/2017 | Yoon ................. H04W 36/0033 |
| 2017/0311208 | A1* | 10/2017 | Yu ......................... H04W 36/00 |
| 2017/0325099 | A1 | 11/2017 | Na et al. |
| 2017/0374608 | A1* | 12/2017 | Li ........................ H04W 48/08 |
| 2018/0270696 | A1* | 9/2018 | Duan .................... H04W 48/02 |
| 2018/0279202 | A1* | 9/2018 | Tenny ................. H04W 40/246 |
| 2019/0297538 | A1* | 9/2019 | Keller ............... H04W 36/0022 |
| 2019/0313473 | A1* | 10/2019 | Kim ....................... H04W 48/02 |
| 2020/0068449 | A1* | 2/2020 | Jin ........................ H04W 36/08 |
| 2021/0136633 | A1* | 5/2021 | Zetterlund ........... H04W 36/14 |

FOREIGN PATENT DOCUMENTS

| | | | |
|---|---|---|---|
| CN | 101640915 | A | 2/2010 |
| CN | 101800960 | A | 8/2010 |
| CN | 102934487 | A | 2/2013 |
| CN | 103563445 | A | 2/2014 |
| CN | 103906158 | A | 7/2014 |
| CN | 104145464 | A | 11/2014 |
| CN | 106576278 | A | 4/2017 |
| KR | 10-2010-0089028 | | 8/2010 |
| KR | 10-2013-0008157 | | 1/2013 |
| KR | 10-2013-0081883 | | 7/2013 |
| KR | 10-2014-0117952 | | 10/2014 |
| KR | 10-2016-0009804 | | 1/2016 |
| WO | WO 2011/088066 | A1 | 7/2011 |
| WO | WO 2012/165893 | A2 | 6/2012 |
| WO | WO 2012/166088 | A1 | 12/2012 |
| WO | WO-2013055271 | A * | 4/2013 ........... H04W 36/08 |
| WO | WO 2013/075746 | A1 | 5/2013 |
| WO | WO 2017/000262 | A1 | 1/2017 |

OTHER PUBLICATIONS

Chinese Office Action dated Mar. 2, 2021 issued in Application 201880013028.5 and English translation.

* cited by examiner

METHOD AND APPARATUS FOR PROVIDING SERVICES IN HETEROGENEOUS NETWORK SYSTEM

RELATED APPLICATIONS

This application is a continuation of International Application No. PCT/KR2018/000413, filed Jan. 9, 2018, which claims priority under 35 U.S.C § 119(a) of Patent Application No. 10-2017-0141485, filed on Oct. 27, 2017 in Korea. The entire disclosures of each of the above applications are incorporated herein by reference.

TECHNICAL FIELD

The present disclosure in some embodiments relates to a method and apparatus for providing a service in heterogeneous network systems.

BACKGROUND

The statements in this section merely provide background information related to the present disclosure and do not necessarily constitute prior art.

With an abruptly increased number of users of mobile communication systems, not only the total data usage has greatly increased but also the data usage and the number of users are increasing in each individual coverage.

In recent years, in order to meet the demand for wireless data traffic, which has been on the rise since the commercialization of 4G (4th-Generation) communication system, efforts are being made to develop a next generation network such as 5G (5th-Generation) communication system or pre-5G communication system.

The mobile communication system utilizes radio transmission, and the quality of radio transmission changes with time depending on the radio state between the terminal and the base station. When the radio transmission quality is below a certain level, provision of service itself can be unavailable. For example, when a particular service is to be provided, the terminal may be difficult or unable to be provided with the particular service due to a change in network status to a certain level or less of the mobile communication system to which the terminal is currently connected.

In order to prevent the above-mentioned situation, a mobile communication system needs to support appropriate levels of service quality and mobility taking into account the characteristics of the user's service. In particular, services having a high level of importance such as an emergency call or a disaster warning text message is required to be provided regardless of the status of the user terminal, the network status, and the like.

The present disclosure in some embodiments seeks to provide a method and apparatus for providing a service in heterogeneous network systems, which provide a particular service as being difficult or unable to be provided directly by one network system to which a user equipment is connected, through a temporary use of resources or capabilities of another network system.

SUMMARY

In accordance with some embodiments of the present disclosure, a method of providing a service in heterogeneous network systems, the method comprising: performing a registration by a user equipment with a first network system comprising: indicating by the first network system towards the user equipment service-related information that can be provided by a second network system; determining by the first network system whether to provide a particular service through the second network system taking into account a capability of the user equipment and network, and details of service-related information of the particular service; performing a system switchover process comprising: transmitting a system switchover command by the first network system to the user equipment taking into account the capability of the user equipment when the first network system determines that the particular service is provided through the second network system to the user equipment; and performing a service receiving process by the user equipment comprising: establishing a connection with the second network system based on the system switchover command, and receiving the particular service from the second network system.

In accordance with some embodiments of the present disclosure, a terminal apparatus for receiving a particular service in heterogeneous network systems, the terminal apparatus comprises: a transmission/reception unit configured to transmit and receive signals; and a control unit configured to perform a registration with a first network system, to perform a system switchover by establishing a connection with a second network system in response to a system switchover command for the second network system capable of providing a particular service, and to receive the particular service from the second network system that is switched over, wherein the first network system indicates towards the terminal service-related information that can be provided by the second network system when the control unit performs the registration with the first network system.

In accordance with some embodiments of the present disclosure, a system of providing a service in heterogeneous network systems, the system comprises: a means for performing a registration of a user equipment with a first network system comprising: a means for indicating towards the user equipment service-related information that can be provided by a second network system; a means for determining whether to provide a particular service through the second network system taking into account a capability of the user equipment and network, and details of service-related information of the particular service; and a means for performing a system switchover process comprising: a means for transmitting a system switchover command to the user equipment taking into account the capability of the user equipment when the means for determining determines that the particular service is provided through the second network system to the user equipment, wherein the user equipment establishes a connection with the second network system based on the system switchover command, and receives the particular service from the second network system.

REFERENCE NUMERALS

Figure 1:
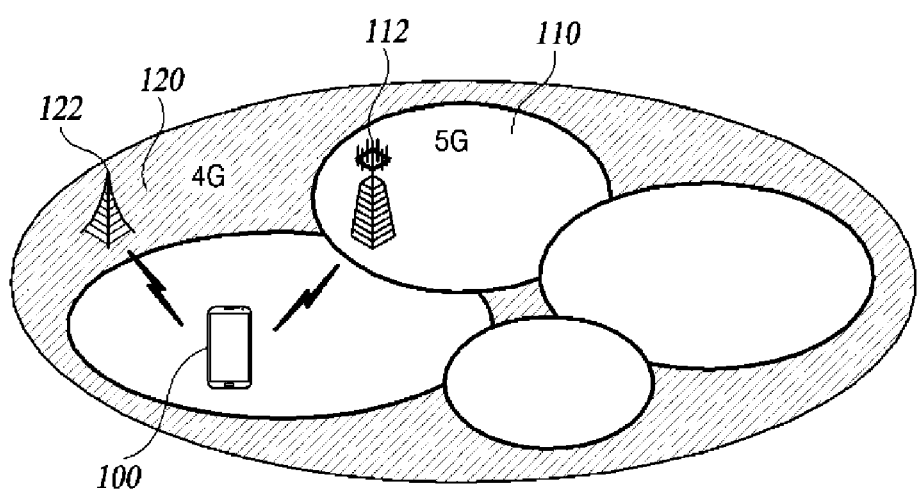
FIG. 1 is a conceptual diagram of heterogeneous network systems according to at least one embodiment of the present disclosure.

| | |
|---|---|
| 100: user equipment | 110: first network system |
| 112: first system base station | 114: first system core |
| 120: second network system | |
| 122: second system base station | 124: second system core |
| 610, 710, 820: transmitting/receiving unit | |
| 620, 720, 820: control unit | |

DETAILED DESCRIPTION

Hereinafter, some embodiments of the present disclosure will be described in detail with reference to the accompanying drawings.

In the following description, like reference numerals designate like elements, although the elements are shown in different drawings. Further, in the following description of some embodiments, a detailed description of known functions and configurations incorporated therein will be omitted for the purpose of clarity and for brevity. The terms such as "unit," "module," and the like refer to units for processing at least one function or operation, which may be implemented by hardware, software, or a combination thereof. In addition, some of the steps constituting embodiments of the present disclosure may be omitted or reordered.

The present disclosure resolves the difficulty of a wireless communication system providing a particular service, by temporarily using another wireless communication system for providing that particular service, which is applicable to such industry and technology fields that utilize a mobile communication system. More specifically, the present disclosure is directed to a mobile communication system such as Evolved Packet System, Long Term Evolution System, or their next generation systems operating based on the 3GPP standard.

This specification will describe a wireless communication system in which a conventional wireless communication system coexists with a next generation wireless communication system and which can provide a multiple connectivity service to a user equipment by linking a plurality of different wireless access technologies. At least one embodiment of the present disclosure will be described taking a Long Term Evolution (LTE) or 4G system as an example of a conventional wireless communication system, and a 5G system or a New Radio (NR) system as an example of the next generation wireless communication system. However, this is exemplary only, and may at least partially include other wireless communication systems.

FIG. 1 is a conceptual diagram of heterogeneous network systems according to at least one embodiment of the present disclosure.

As shown in FIG. 1, one network system can operate as it coexists with another heterogeneous network system. For example, heterogeneous network systems may be constructed wherein a first network system 110 and a second network system 120 coexist.

The heterogeneous network systems according to some embodiments may include a user terminal or user equipment (UE) 100, the first network system 110, the second network system 120, and the like. The first network system 110 may be a next generation network system, for example, a 5G mobile communication system, and the second network system 120 may be a conventional network system such as a 4G mobile communication system.

The user equipment (UE) 100 is an entity for communicating with a base station, and it may be fixed or mobile. The UE 100 may be referred to not only as a UE but also as a mobile station (MS), a mobile equipment (ME), a terminal, and the like.

The first network system 110 may have components including a first base station apparatus or first system base station 112, a first core network apparatus or first system core 114, and the like. The second network system 120 may have components including a second base station apparatus or a second system base station 122, a second core network apparatus or second system core 124, and the like.

The first system base station 112 and the second base station apparatus 122 may be base stations. Herein, a base station is an entity that communicates with a terminal, and it provides a linkage to a core network. The base station may be referred to as a BS, a NodeB (NB), an eNodeB (eNB), a gNodeB (gNB), and the like.

The first system core 114 and the second system core 124 may be apparatuses constituting the core networks of the respective first and second networks.

The first system core 114 may be, for example, an Access and Mobility Management Function (AMF) in a 5G network. Here, the AMF is a termination of a Radio Access Network (RAN) Control Plane (CP) interface (e.g., N2) and a termination of a Non-Access Stratum (NAS). AMF supports functions such as registration management, connection management, reachability management, mobility management, access authentication, and access authorization. The AMF may be implemented in the form of a virtualized network apparatus installed with software of the above functions. In other words, the AMF may be implemented as a virtualized node rather than a physical node.

In addition, the second system core 124 may be a Mobility Management Entity (MME) in the LTE network. The MME performs an operation of allocating a serving gateway (S-GW) and a PDN gateway (PGW) in the LTE network according to the type of mobile communication service for making an end to end (E2E) connection between the UE and the PDN.

The present disclosure in some embodiments can provide a particular service in a heterogeneous network when that service is difficult or unable to be provided directly, through a temporary use of resources or capabilities of another network system, whereby ensuring fail-safe provision of mission critical emergency calls, emergency text, voice services, or such services, while improving the service quality, mobility and service availability among other properties. Hereinafter, a method of providing a service in heterogeneous network systems through the first to fourth embodiments will be described.

Figure 2:
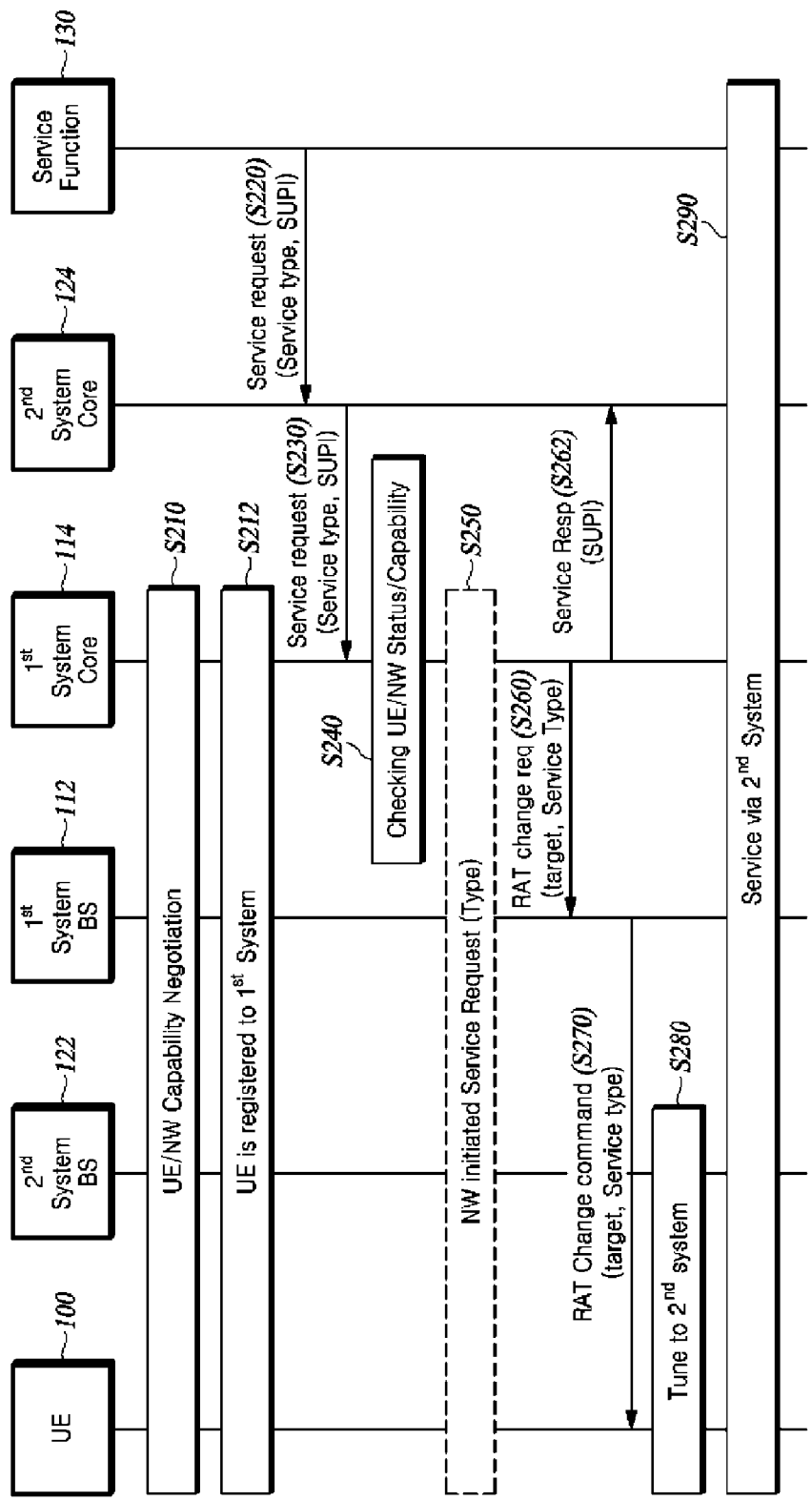
FIG. 2 is a flowchart of a method of providing a service in heterogeneous network systems according to a first embodiment of the present disclosure.

FIG. 2 is a flowchart of a method of providing a service in heterogeneous network systems according to a first embodiment of the present disclosure.

FIG. 2 illustrates the operation of the UE 100, the heterogeneous network systems 110 and 120, and the service function or service node 130 for providing services in the heterogeneous network systems according to the first embodiment of the present disclosure. Here, the heterogeneous network systems 110 and 120 may include a first network system 110 and a second network system 120, and they may further include a subscriber information DB (not shown) for managing subscriber information of the first network and the second network, and the like.

According to the first embodiment, the first network system 110 may have components including the first system BS 112, the first system core 114, and the like. The second network system 120 may have components including the second system BS 122, the second system core 124, and the like.

In the first embodiment of the present disclosure, the UE 100 exchanges service-related information that can be provided by the second network system 120 when the UE 100 accesses the first network system 110 in order to receive a service, and when the first network system 110 has a difficulty to provide the service to the UE 100, the UE 100 is provided with the service by switching the connection of the UE 100 to the second network system 120. Hereinafter, a method of providing a service in the heterogeneous network systems according to the first embodiment will be described in detail with reference to FIG. 2.

The UE 100 negotiates the capability of the user equipment and the network with the first network system 110 (in Step S210), and it attaches or registers the UE 100 itself to the first network system 110 (performing Attach or Registration in Step S212).

Specifically, the UE 100 transmits a registration request for the connection with the network system 110, and the first network system 110 is responsive to the registration request for performing the registration by sending the UE 100 an attach or registration acceptance message. Here, the registration between the UE 100 and the first network system 110 is performed after a Radio Resource Control (RRC) connection is processed, by exchanging a non-access stratum (NAS) signaling message over that connection. The UE 100 needs to be registered prior to receiving a communication service from the network system.

Carrying out the registration between the UE 100 and the first network system 110, the first system core 114 in the first network system 110 may exchange information with the second network system 120. In particular, the first system core 114 may connect to the second network system 120 and transmit information on the capability of the UE 100.

In addition, the first network system 110 exchanges types of services to be received by the UE 100 through the second network system 120, details of service-related information, and the like. At this time, the first network system 110 may determine whether to provide a service to the UE 100 through the second network system 120.

When the UE 100 permits the operation for providing the service through the second network system 120, the first system core 114 transmits to the second system core 124 information on the UE 100 and information about the service to be provided through the second network system 120. At this time, the first system core 114 may obtain a response signal indicating whether or not the service is available from the second system core 124.

The second system core 124 delivers system switching-related information in advance to the first system core 114 to provide a particular service. The second system core 124 can shorten the time required for switching from the first network system 110 to the second network system 120 by transferring system switching-related information in advance. In this case, the system switching-related information may be transmitted in a form included in the response signal indicating whether or not the service is available, and it may include a temporary identifier of the UE, security-related information, QoS-related information, information related to the second network system's wireless base station that needs to be connected for the particular service, and the like.

The first system core 114 transmits the system switching-related information received from the second system core 124 to UE 100. Here, the system switching-related information may be transmitted being included in or simultaneously with the registration acceptance message.

In Step S210 and Step S212, the second network system 120 may perform a process for registering information on the second system core 124 in a subscriber information DB (not shown) to receive a service request signal such as the service's occurrence/arrival alarm, and the like. Herein, the operation of registering the information on the second system core 124 in the subscriber information DB (not shown) may be performed directly by the second network system 120, although the present disclosure is not limited thereto. Instead, the process may be performed by the first network system 110 transferring the address of the second system core 124 to the subscriber information DB (not shown).

The first network system 110 receives a service request signal from the service node 130 (S220, S230), and it determines, taking into account the capability of the user equipment and the network, one between the first network system 110 and the network system 120 for providing the service (S240).

Specifically, when receiving the service request signal according to the service occurrence, the service node 130 puts a query to the subscriber information DB (not shown) about which network system it is supposed to transfer the received service request signal by using the type of service, a subscriber identifier, and the like. Then, the service node 130 receives the address of the second system core 124 registered in Step S210 and Step S212 from the subscriber information DB (not shown). Here, the identifier of the subscriber means a concept including the identifier of the user equipment, and it may be used as an identifier of the user equipment when there is a user equipment specified for the service.

The service node 130 delivers a service request message including the type of service, the identifier of the subscriber, etc. to the second system core 124, and the second system core 124 transmits the service request message to the first system core 114.

The first system core 114 determines taking into account the capability of the user equipment and the network, whether to provide the service corresponding to the service request message through the second network system 120.

The first system core 114 performs a paging between the UE 100 and the first network system 110 to resume communication (S250).

Specifically, when the UE 100 is in the idle state, the first system core 114 performs a paging to resume the communication of the UE 100. In other words, the first system core 114 may transmit a network resumption request signal or NW-initiated service request to the UE 100 in order to change the RRC-IDLE state of the UE 100 to the RRC-CONNECTED state.

The first network system 110 transmits a system change or switchover command to the UE 100 (S260, S270).

More specifically, the first system core 114 sends a system switchover command to the first system BS 112 for providing the particular service, and the first system BS 112 transfers the received system switchover command to the UE 100. In other words, the first system core 114 transmits a system switchover command which indicates switchover from the first network system 110 to the second network system 120 for reception of the particular service via the first system BS 112 to the UE 100. Here, the system switchover command may include an identifier of the subscriber, the service type, and the like.

While transferring the system switchover command to the UE 100, the first network system 110 causes an operation to be performed to release the RRC connection between and the first system BS 112 and the UE 100.

Further, to shorten the time for the system switchover from the first network system 100 to the second network system 120, the first network system 110 may perform a process for exchanging information with the second network system 120. In other words, when the first system BS 112 can collect information about the second system BS 122 currently adjacent to the first system BS 112, it may shorten the time for the UE 100 to access the second system BS 122 for system switching, by transferring to the UE 100 prior to the operation of the system switching the information related to the second network system 120, such as the frequency, the cell identifier, the system-related information periodically transmitted by the second network system 120, and the like.

The UE 100 performs a connection with the second network system 120 (S280), and it receives the service from the second network system 120 (S290).

Specifically, the UE 100 is switched to the second network system 120 by connecting to the second system BS 122 based on the system switchover command. Here, the UE 100 accesses the second system BS 122 by preferentially utilizing the information related to the second network system 120 obtained in Step S270. The UE 100 is provided with the particular service by using the second network system 120 linked therewith.

Figure 3:
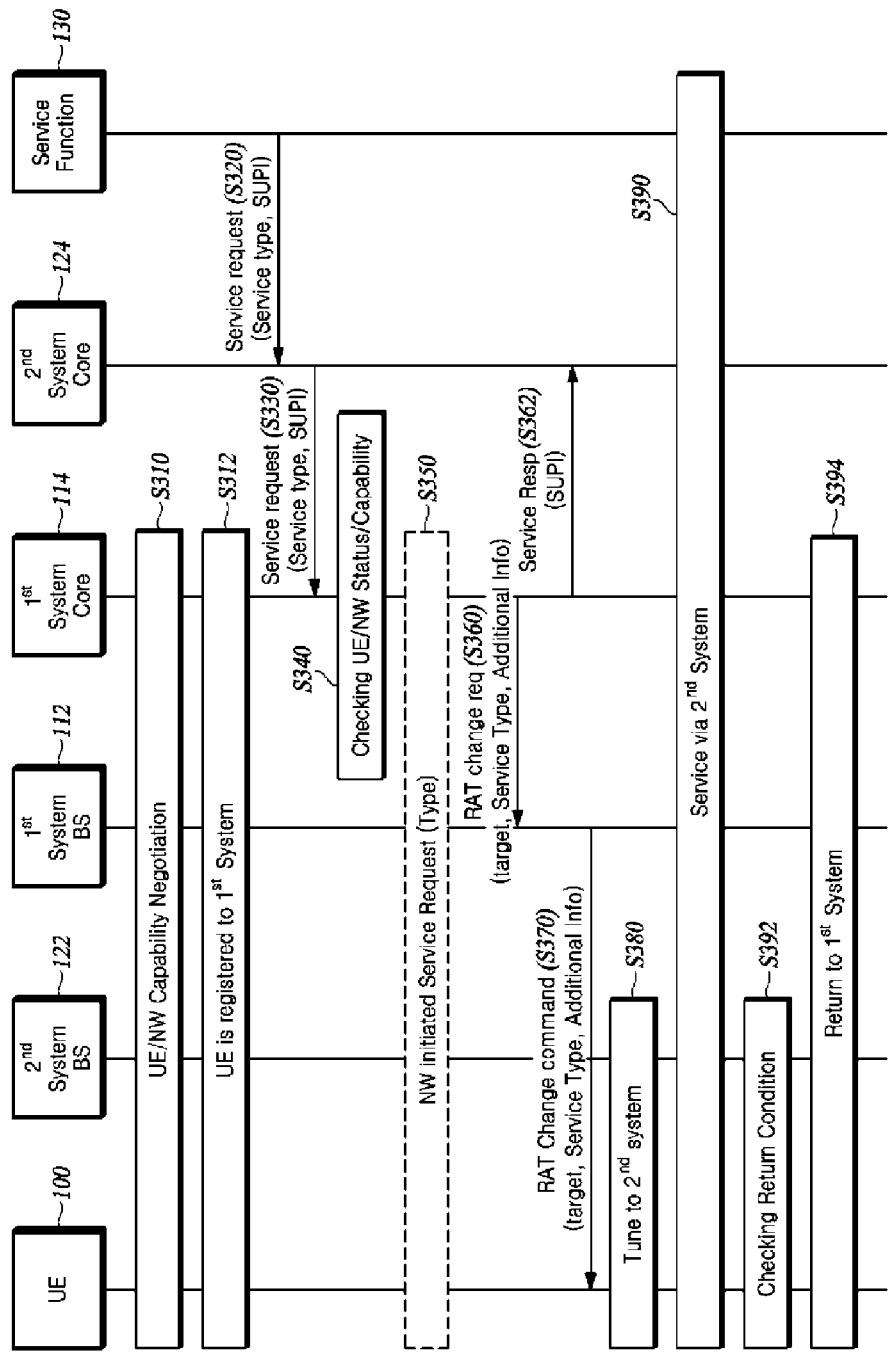
FIG. 3 is a flowchart of a method of providing a service in heterogeneous network systems according to a second embodiment of the present disclosure.

FIG. 3 is a flowchart of a method of providing a service in heterogeneous network systems according to a second embodiment of the present disclosure.

Illustrated are operations performed by the UE 100, the heterogeneous network systems 110 and 120, and the service node 130 for providing a service in the heterogeneous network systems according to the second embodiment of the present disclosure. Here, the heterogeneous network systems 110 and 120 may include a first network system 110 and a second network system 120, and it may further include a subscriber information DB (not shown) for managing subscriber information of the first network and the second network, and other components.

The first network system 110 may include components such as the first system BS 112, the first system core 114, and the second network system 120 may include components such as the second system BS 122, the second system core 124, and the like.

In the second embodiment of the present disclosure, the UE 100 exchanges service-related information that can be provided by the second network system 120 when the UE 100 accesses the first network system 110 in order to receive a service, and when the first network system 110 has a difficulty to provide the service to the UE 100, the UE 100 is provided with the service by switching the connection of the UE 100 to the second network system 120, and thereafter returns to the first network system 110 based on system return information. Hereinafter, a method of providing a service in the heterogeneous network systems according to the second embodiment will be described in detail with reference to FIG. 3.

Steps S310 to S350 of FIG. 3 are similar to Steps S210 to S250 of FIG. 2, and therefore their detailed description will be omitted.

The first network system 110 transmits a system switchover command additionally including system return information to the UE 100 (S360, S370).

More specifically, the first system core 114 sends a system switchover command to the first system BS 112 for providing the particular service, and the first system BS 112 transfers the received system switchover command to the UE 100. In other words, the first system core 114 transmits a system switchover command which indicates switchover from the first network system 110 to the second network system 120 for reception of the particular service via the first system BS 112 to the UE 100. Here, the system switchover command may include an identifier of the subscriber, the service type, system return information, and the like.

The system return information included in the system switchover command refers to information required when the UE 100 performs an operation upon receiving a particular service after the system switchover. For example, the system return information may include information on a priority of the system to be used after the UE 100 completes the reception of the particular service (a priority for the determination of whether to stay in the second network system 120 preferentially or to return to the first network system 110), information on a time for determining whether or not to return to the first network system 110 before the system switchover (immediately after the end of the service, a certain time value after the end of the service, no return at any time, etc.).

While transferring the system switchover command to the UE 100, the first network system 110 causes an operation to be performed to release the RRC connection between the first system BS 112 and the UE 100.

Further, to shorten the time for the system switchover from the first network system 110 to the second network system 120, the first network system 110 may perform a process for exchanging information with the second network system 120. In other words, when the first system BS 112 can collect information about the second system BS 122 currently adjacent to the first system BS 112, it may shorten the time for the UE 100 to access the second system BS 122 for system switching, by transferring to the UE 100 prior to the operation of the system switching the information related to the second network system 120, such as the frequency, the cell identifier, the system-related information periodically transmitted by the second network system 120, and the like.

The UE 100 performs a connection with the second network system 120 (S380), and it receives the service from the second network system 120 (S390).

Specifically, the UE 100 is switched to the second network system 120 by connecting to the second system BS 122 based on the system switchover command. Here, the UE 100 accesses the second system BS 122 by preferentially utilizing the information related to the second network system 120 obtained in Step S370. The UE 100 is provided with the particular service by using the second network system 120 linked therewith.

The UE 100 determines the system to return on the basis of the system return information after termination of the service received from the second network system 120 (S392), it performs a reconnection to the determined system to return (S394).

Specifically, when receiving the system switchover command including the system return information in Step S360 and Step S370, the UE 100 performs the subsequent operation after receiving the particular service by using the system return information. For example, when the system return information includes the priority of systems, the UE 100 determines the system to connect according to the priority. When the system return information includes a time to determine whether to return, the UE 100 determines whether or not to return according to the relevant condition.

Figure 4:
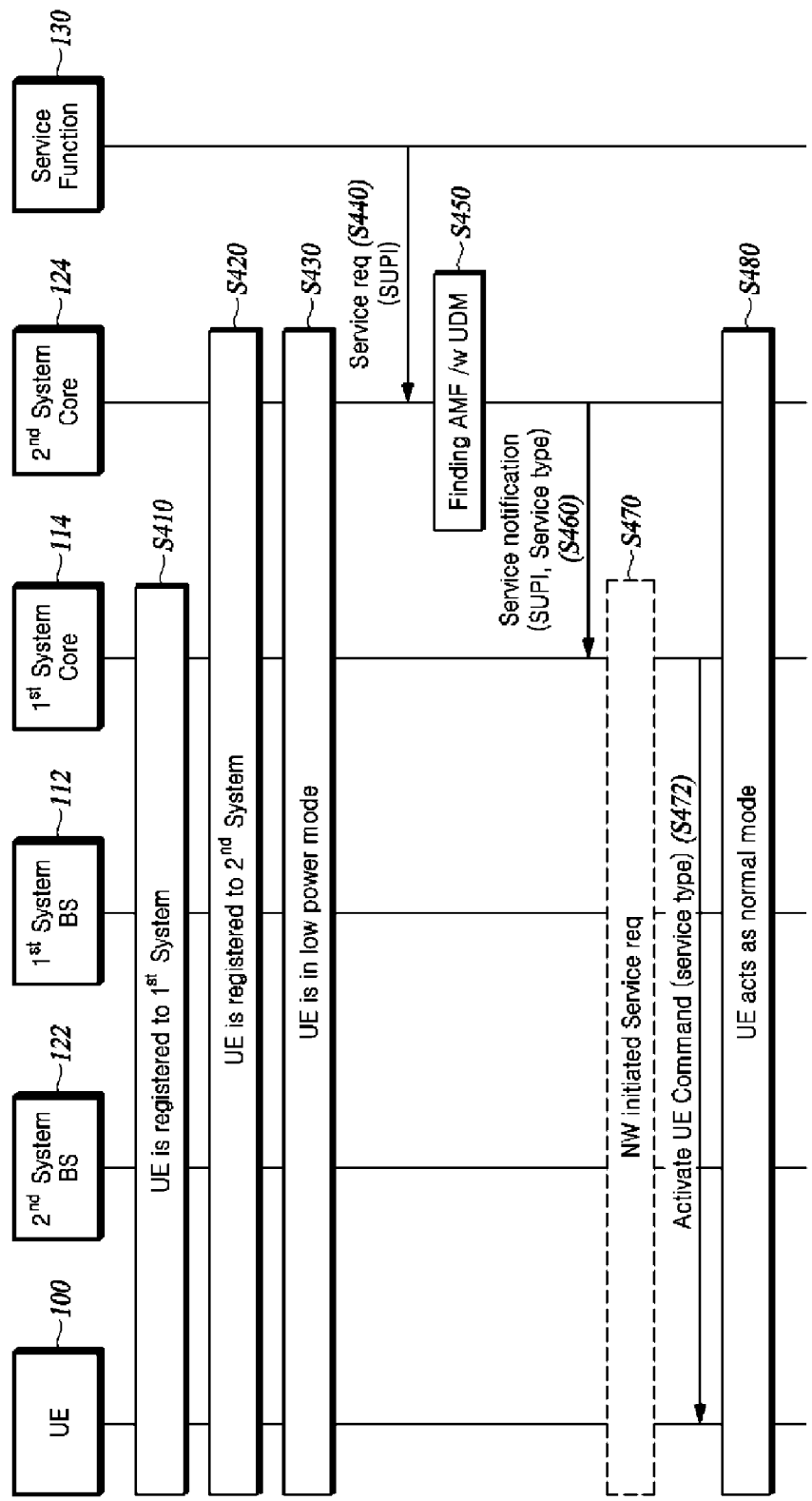
FIG. 4 is a flowchart of a method of providing a service in heterogeneous network systems according to a third embodiment of the present disclosure.

FIG. 4 is a flowchart of a method of providing a service in heterogeneous network systems according to a third embodiment of the present disclosure.

Illustrated are operations performed by the UE 100, the heterogeneous network systems 110 and 120, and the service node 130 for providing a service in the heterogeneous network systems according to the third embodiment of the present disclosure. Here, the heterogeneous network systems 110 and 120 may include a first network system 110 and a second network system 120, and it may further include a subscriber information DB (not shown) for managing subscriber information of the first network and the second network, and other components.

The first network system 110 may include components such as the first system BS 112, the first system core 114, and the second network system 120 may include components such as the second system BS 122, the second system core 124, and the like.

The third embodiment of the present disclosure provides a method of effectively providing a service to the UE 100 supporting a dual registration function that can be simultaneously connected to the first network system 110 and the second network system 120. Hereinafter, with reference to FIG. 4, a method of providing a service in heterogeneous network systems according to the third embodiment will be described in detail.

The UE 100 performs registration in the name of Attach or Registration with the first network system 110 and the second network system 120 (S410 and S420).

More specifically, the UE 100 operates in the dual registration status to perform a registration with both the first network system 110 and the second network system 120. Herein, the registration of the UE 100 may be sequentially processed in the first network system 110 and the second network system 120, but the present disclosure is not limited thereto, and it may be simultaneously processed in separate operations.

After the UE 100 registers, the first network system 110 operates in a general mode, and the second network system 120 switches to a Mobile Initiated Communication Only (MICO) mode or a power saving or sleep mode (S430).

More specifically, the UE 100 receives the general service via the first network system 110, and it receives a particular service through the second network system. Accordingly, the first network system 110 for receiving the general service operates in the normal mode, and the second network system 120 for receiving the particular service is switched to the MICO mode or the sleep mode while the particular service is not in progress. In the MICO mode, the UE 100 operates in a power save state without performing an operation for receiving a service in the downlink, and only when the UE 100 explicitly needs data transmission, it actively requests the network system for a switchover to the normal mode.

In Step S430, the second network system 120 may switch to the MICO mode and exchange the type of the particular service with the first network system 110 in advance. The advance exchange of the type of the particular service allows reception of information for switching the second network system 120 back to the normal mode according to the occurrence of the particular service, through the first network system 110.

The second network system 120 receives a service request signal from the service node 130 (S440), and it checks the address of the first network system 110 (S450), and then transmits a service occurrence message or notification to the first network system 110 (S460).

Specifically, upon receiving the service request signal subsequent to the occurrence of the service, the service node 130 transmits the fact that the particular service related to the second network system 120 occurred to the second system core 124 by using the type of service, a subscriber identifier, and the like.

Then, the second system core 124 puts a query about the address of the first system core 114 which the UE 100 is currently registered with, to the subscriber information DB (not shown) which the first network system 110 and the second network system 120 are commonly interlocked with, and it receives a response signal to the query.

The second system core 124 utilizes the received address of the first system core 114 from the subscriber information DB (not shown) to transmit a service occurrence message about the particular service to the first system core 114. Here, the service occurrence message includes information on an identifier for the subscriber, the service type, and the like.

Paging is performed between the UE 100 and the first network system 110 to resume communication (S470).

Specifically, when the UE 100 is in the idle state, the first system core 114 performs a paging to resume the communication of the UE 100. In other words, the first system core 114 may transmit a network resumption request signal (NW-initiated Service Request) to the UE 100 in order to change the RRC-IDLE state of the UE 100 to the RRC-CONNECTED state.

The first network system 110 transmits the mode change or switchover command related to the occurrence of the particular service to the UE 100 (S472).

Specifically, when the connection is resumed between the UE 100 and the first network system 110, the first system core 114 transmits a mode switchover command to the UE 100 to receive the particular service by switching the second network system 120 from the MICO mode to the normal mode.

The UE 100 performs control for switching the second network system 120 to the normal mode based on the mode switchover command, and it receives the particular service through the second network system 120 that is switched to the normal mode (S480). Specifically, the UE 100 performs processes of a tracking area update, an attach process, and the like in order to switch the second network system 120 into the normal mode. After switching of the second network system 120 to the normal mode, the UE 100 transmits the particular service through the second network system 120.

The third embodiment considers the case where the UE 100 operates in the MICO mode for a specific network system, although the present disclosure may also be applied to the case where the UE 100 operates in a similar power saving mode.

Figure 5:
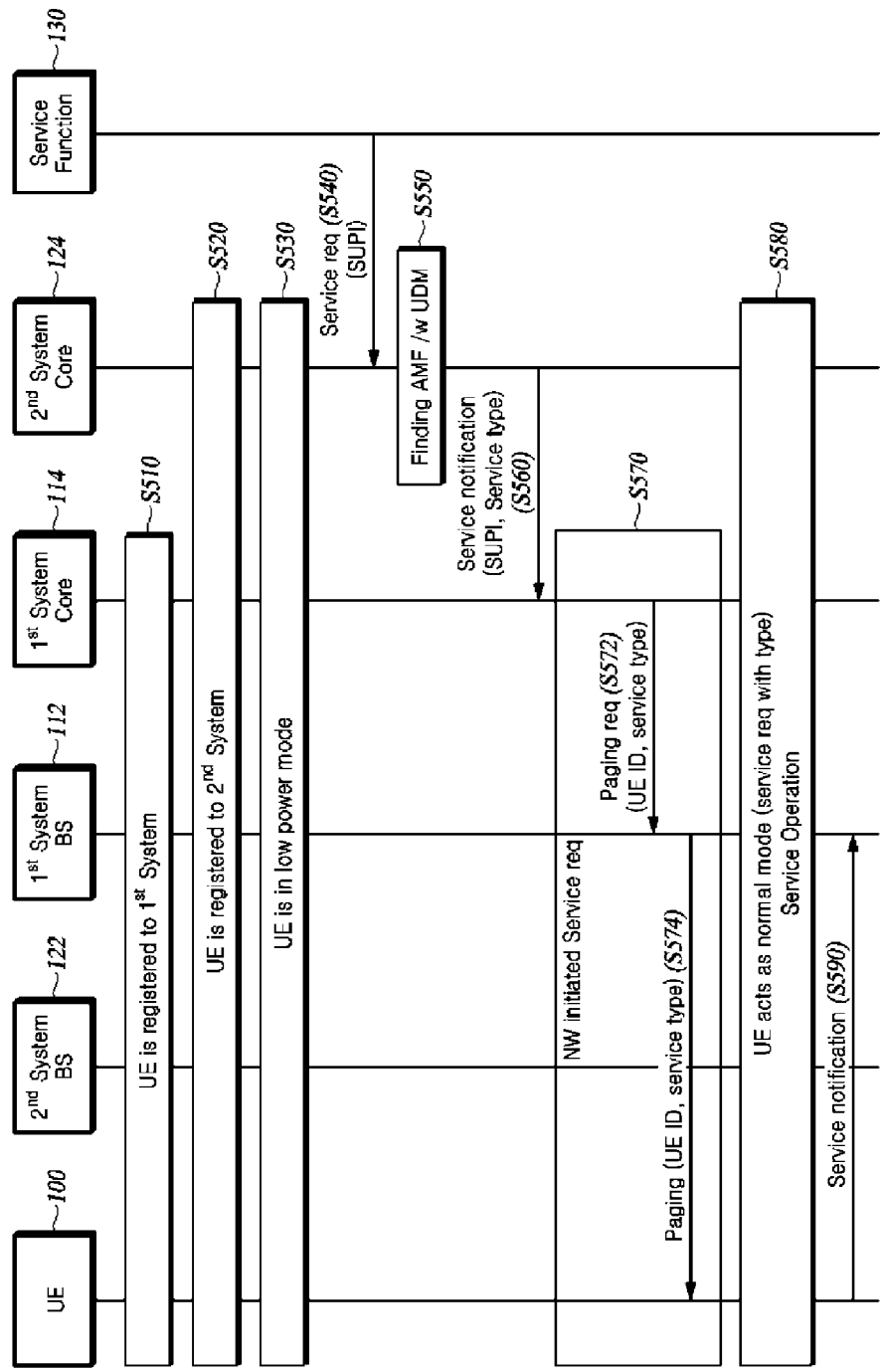
FIG. 5 is a flowchart of a method of providing a service in heterogeneous network systems according to a fourth embodiment of the present disclosure.

FIG. 5 is a flowchart of a method of providing a service in heterogeneous network systems according to a fourth embodiment of the present disclosure.

Illustrated are operations performed by the UE 100, the heterogeneous network systems 110 and 120, and the service node 130 for providing a service in the heterogeneous network systems according to the fourth embodiment of the present disclosure. Here, the heterogeneous network systems 110 and 120 may include a first network system 110 and a second network system 120, and it may further include a subscriber information DB (not shown) for managing subscriber information of the first network and the second network, and other components.

The first network system 110 may include components such as the first system BS 112, the first system core 114, and the second network system 120 may include components such as the second system BS 122, the second system core 124, and the like.

The fourth embodiment of the present disclosure presents, in effectively providing a service to the UE 100 supporting the Dual Registration function which can be simultaneously connected to the first network system 110 and the second network system 120, a method of shortening the time for switching from the first network system 110 to the second network system 120. Hereinafter, a method of providing a service in heterogeneous network systems according to the fourth embodiment will be described in detail with reference to FIG. 5.

Steps S510 to S560 of FIG. 5 are similar to Steps S410 to S460 of FIG. 4, and a detailed description thereof will be omitted.

While performing a paging procedure between the UE 100 and the first network system 110 (S570), the first network system 110 transmits a network resumption request signal (NW-initiated Service Request) for paging to the UE 100 (S572, S574).

Specifically, when the UE 100 is in the idle state, the first system core 114 performs a paging to resume the communication of the UE 100. In other words, the first system core 114 may transmit a network resumption request signal (NW-initiated Service Request) to the UE 100 in order to change the RRC-IDLE state of the UE 100 to the RRC-CONNECTED state. Here, the NW-initiated Service Request further includes information on a service to be received through the second network system 120, in addition to the information for paging.

The UE 100 performs control for switching the second network system 120 to the normal mode based on the NW-initiated Service Request, and it receives the service through the second network system 120 that is switched to the normal mode (S580).

Specifically, the UE 100 utilizes information on a service to be received through the second network system 120 included in the NW-initiated Service Request as a basis for switching the second network system 120 to the normal mode without searching for a network system to be connected, and it receives the service through the second network system 120 that is switched to the normal mode.

The UE 100 transmits a message of normal reception of the NW-initiated Service Request and the switchover to the normal mode of the second network system 120 to the first network system 110, whereby terminating any more paging process of the first network system 110 (S590).

Specifically, the UE 100 is responsive to the NW-initiated Service Request for performing a paging and transmitting the message of the switchover to the normal mode of the second network system 120 to the first network system 110. Accordingly, the first network system 110 stops the paging operation for the UE 100.

Figure 6:
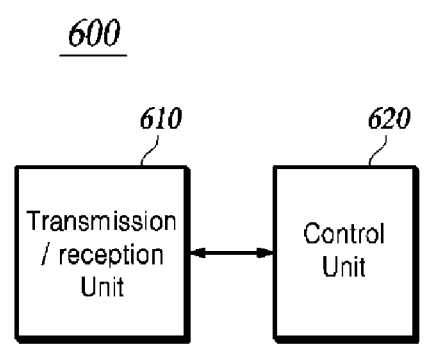
FIG. 6 is a schematic block diagram of a configuration of a user equipment according to at least one embodiment of the present disclosure.

FIG. 6 is a schematic block diagram of a configuration of a user equipment according to at least one embodiment of the present disclosure.

The user equipment 600 includes a transmission/reception unit 610 and a control unit 620. Respective components of the user equipment 600 may be implemented as a hardware chip, or it may be implemented as software with a microprocessor implemented to execute the functions of the software corresponding to the respective components.

The transmission/reception unit 610 transmits and receives signals to perform communication with other network function nodes, a first system base station (BS) and a second system BS.

The control unit 620 performs registration with the first network system 110. Upon receiving a system switchover command for the second network system 120 capable of providing a particular service, the control unit 620 performs a connection with the second network system 120 to carry out the system switchover, and it receives the particular service from the second network system 120 that is switched on. The control unit 620 may also be configured to reconnect the user equipment to the first network system 110 based on a system return information upon confirmation thereof, which has been obtained in advance, or render the user equipment to maintain connection with the second network system 120.

When a registration of the user equipment is performed with both the first network system 110 and the second network system 120, the control unit 620 controls the first network system 110 for providing the general service to be in the normal mode, and controls the second network system 120 for providing the particular service to be in the MICO mode or the power saving mode.

When a mode switchover command for the particular service is received, the control unit 620 performs a mode switchover of the second network system 120 from the power saving mode to the normal mode, and receives the particular service from the second network system 120.

Although FIGS. 2 to 5 illustrate that the respective processes are sequentially executed, they are merely illustrative of the technical idea of the embodiment of the present disclosure. In other words, those skilled in the art would appreciate that various modifications, additions and substitutions are possible by performing the sequences shown in FIGS. 2 to 5 in a different order or at least one of steps in parallel without departing from the idea and scope of the embodiments, and hence the examples shown in FIGS. 2 to 5 are not limited to the chronological order.

The steps shown in FIGS. 2 to 5 can be implemented as computer-readable codes on a computer-readable recording medium. The computer-readable recording medium includes any type of recording device on which data that can be read by a computer system are recordable. Examples of the computer-readable recording medium include a magnetic storage medium (e.g., a ROM, a floppy disk, a hard disk, etc.), an optically readable medium (e.g., a CD-ROM, a DVD, etc.), and the like, and also include one implemented in the form of a carrier wave (e.g., transmission through the Internet). Further, the computer-readable recording medium has computer-readable codes that can be stored and executed in a distributed mode in computer systems connected via a network.

According to at least one embodiment of the present disclosure as described above, a temporary or ongoing inability to provide a particular service in a given network system can be resolved by utilizing the resources of another network system to effect provision of that service.

Further, according to at least one embodiment of the present disclosure, there is an effect of ensuring fail-safe provision of mission critical emergency calls, emergency text, voice services, or such services.

According to at least one embodiment of the present disclosure, when a terminal can simultaneously register with two network systems, an infrastructure for a particular service is arranged to be linked to only one system rather than to both systems, whereby increasing the efficiency of network operation.

Further, according to at least one embodiment of the present disclosure, there is an effect of reducing the power consumption of the terminal as well as the waiting time for the particular service.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not limited by the explicitly described above embodiments but is inclusive of the claims and equivalents thereof.

What is claimed is:

1. A method of providing a service in heterogeneous network systems, the method comprising:
   performing a registration by a user equipment with a first network system including indicating by the first network system towards the user equipment service-related information that can be provided by a second network system;
   after the user equipment is registered with the first network system, determining by the first network system whether to provide a particular service through the second network system by taking into account a capability of the user equipment and network, and details of service-related information of the particular service;
   while the user equipment is registered with the first network system, performing a system switchover process including transmitting a system switchover command by the first network system to the user equipment by taking into account the capability of the user equipment when the first network system determines that the particular service is to be provided through the second network system to the user equipment, wherein the system switchover command indicates a switchover from the first network system to the second network system for reception of the particular service via the first network system to the user equipment;
   performing a service receiving process by the user equipment including:
      establishing a connection with the second network system based on the system switchover command, and
      receiving the particular service from the second network system and
      determining a system to return so that the user equipment either returns to the first network system or maintains the connection with the second network system upon a termination of the particular service provided from the second network system,
      wherein the first network system is a next generation network system, and the second network system is a conventional network system, and
      wherein the particular service includes a voice service.

2. The method of claim 1, wherein the performing of the registration includes:
   negotiating a capability of the user equipment and the network between the user equipment and the first network system; and
   exchanging information about the second network system for providing the particular service.

3. The method of claim 1, further comprising:
   when the user equipment is in an idle state, resuming communications by performing a paging between the user equipment and the first network system, and transmitting the system switchover command to the user equipment.

4. The method of claim 1, wherein the system switchover command includes information on a subscriber identifier and a service type, and
   wherein the performing of the service receiving process proceeds to establish a connection with the second network system based on the system switchover command when the system switchover command includes information on the second network system.

5. The method of claim 1, wherein the determining of the system to return includes:
   determining the system to return to between the first network system and the second network system based on a system return information included in the system switchover command.

6. The method of claim 1, wherein the next generation network system is a 5G system, and the conventional network system is a 4G system.

7. A terminal apparatus for receiving a particular service in heterogeneous network systems, the terminal apparatus comprises:
   a transmission/reception unit configured to transmit and receive signals; and
   a control unit configured to:
      perform a registration with a first network system,
      perform a system switchover by establishing a connection with a second network system in response to a system switchover command for the second network system capable of providing a particular service, wherein the system switchover command indicates a switchover from the first network system to the second network system for reception of the particular service via the first network system to the target apparatus,
      receive the particular service from the second network system that is switched over, and
      determining a system to return so that the terminal apparatus either returns to the first network system or maintains the connection with the second network system upon a termination of the particular service provided from the second network system,
      wherein after the control unit performs the registration with the first network system, the first network system indicates towards the terminal service-related information that can be provided by the second network system,
      wherein after the control unit performs the registration with the first network, the first network system determines whether to provide the particular service through the second network system by taking into account a capability of the terminal and network, and details of the service-related information of the particular service,
      wherein the first network system is a next generation network system, and the second network system is a conventional network system, and
      wherein the particular service includes a voice service.

8. The terminal apparatus of claim 7, wherein the next generation network system is a 5G system, and the conventional network system is a 4G system.

* * * * *